United States Patent
Ueda

(10) Patent No.: US 9,121,729 B2
(45) Date of Patent: Sep. 1, 2015

(54) ROTATION ANGLE DETECTION DEVICE

(75) Inventor: Takeshi Ueda, Kashiba (JP)

(73) Assignee: JTEKT CORPORATION, Osaka (JP)

( * ) Notice: Subject to any disclaimer, the term of this patent is extended or adjusted under 35 U.S.C. 154(b) by 483 days.

(21) Appl. No.: 13/326,701

(22) Filed: Dec. 15, 2011

(65) Prior Publication Data

US 2012/0158340 A1    Jun. 21, 2012

(30) Foreign Application Priority Data

Dec. 15, 2010   (JP) ................. 2010-279440

(51) Int. Cl.
  *G01B 7/30*     (2006.01)
  *G01D 5/244*    (2006.01)
  *G01D 5/347*    (2006.01)

(52) U.S. Cl.
  CPC ........... *G01D 5/244* (2013.01); *G01D 5/24461* (2013.01); *G01D 5/3473* (2013.01)
  USPC .................................. 324/207.25

(58) Field of Classification Search
  CPC ............. G06F 3/04815; G06F 3/0488; G06F 3/03545; H04N 5/23261; H04N 7/181; H04N 9/8205; G01D 5/24461; G01B 7/30
  See application file for complete search history.

(56) References Cited

U.S. PATENT DOCUMENTS

| | | | |
|---|---|---|---|
| 7,119,532 B2* | 10/2006 | Nihei et al. ................ | 324/174 |
| 7,218,100 B1 | 5/2007 | Matsumoto et al. | |
| 7,659,713 B2* | 2/2010 | Nakata et al. ............ | 324/207.25 |
| 7,969,147 B2* | 6/2011 | Hatanaka et al. | |
| 2002/0111763 A1 | 8/2002 | Koga | |
| 2008/0052562 A1 | 2/2008 | Kameya et al. | |
| 2009/0206827 A1 | 8/2009 | Aimuta et al. | |
| 2010/0045227 A1 | 2/2010 | Ura et al. | |

FOREIGN PATENT DOCUMENTS

| | | |
|---|---|---|
| EP | 1 018 466 A2 | 7/2000 |
| EP | 1 108 987 A1 | 6/2001 |
| EP | 1 684 051 A1 | 7/2006 |
| JP | A-2002-213944 | 7/2002 |
| JP | A-2006-078392 | 3/2006 |
| JP | A-2007-139739 | 6/2007 |
| JP | A-2008-241411 | 10/2008 |
| JP | A-2008-286709 | 11/2008 |

(Continued)

OTHER PUBLICATIONS

Extended European Search Report dated Apr. 4, 2014 issued in European Patent Application No. 11193347.9.

(Continued)

*Primary Examiner* — Tung X Nguyen
(74) *Attorney, Agent, or Firm* — Oliff PLC

(57) ABSTRACT

A rotation angle calculation unit includes a first rotation angle calculation portion, a second rotation angle calculation portion, a third rotation angle calculation portion, an abnormality monitoring portion, and a final rotation angle calculation portion. The abnormality monitoring portion determines, based on a first output signal, a second output signal, and a third output signal, whether the first to third output signals are each normal or abnormal. The final rotation angle calculation portion calculates a final rotation angle based on the final determination result obtained by the abnormality monitoring portion and the first to third rotation angles calculated by the first to third rotation angle calculation portions, respectively.

6 Claims, 5 Drawing Sheets

(56) References Cited

FOREIGN PATENT DOCUMENTS

| | | |
|---|---|---|
| JP | A-2010-048760 | 3/2010 |
| JP | A-2010-110147 | 5/2010 |

OTHER PUBLICATIONS

Jul. 3, 2014 Notice of Reasons for Rejection Issued in Japanese Patent Application No. 2010-279440 (with English Translation).

* cited by examiner

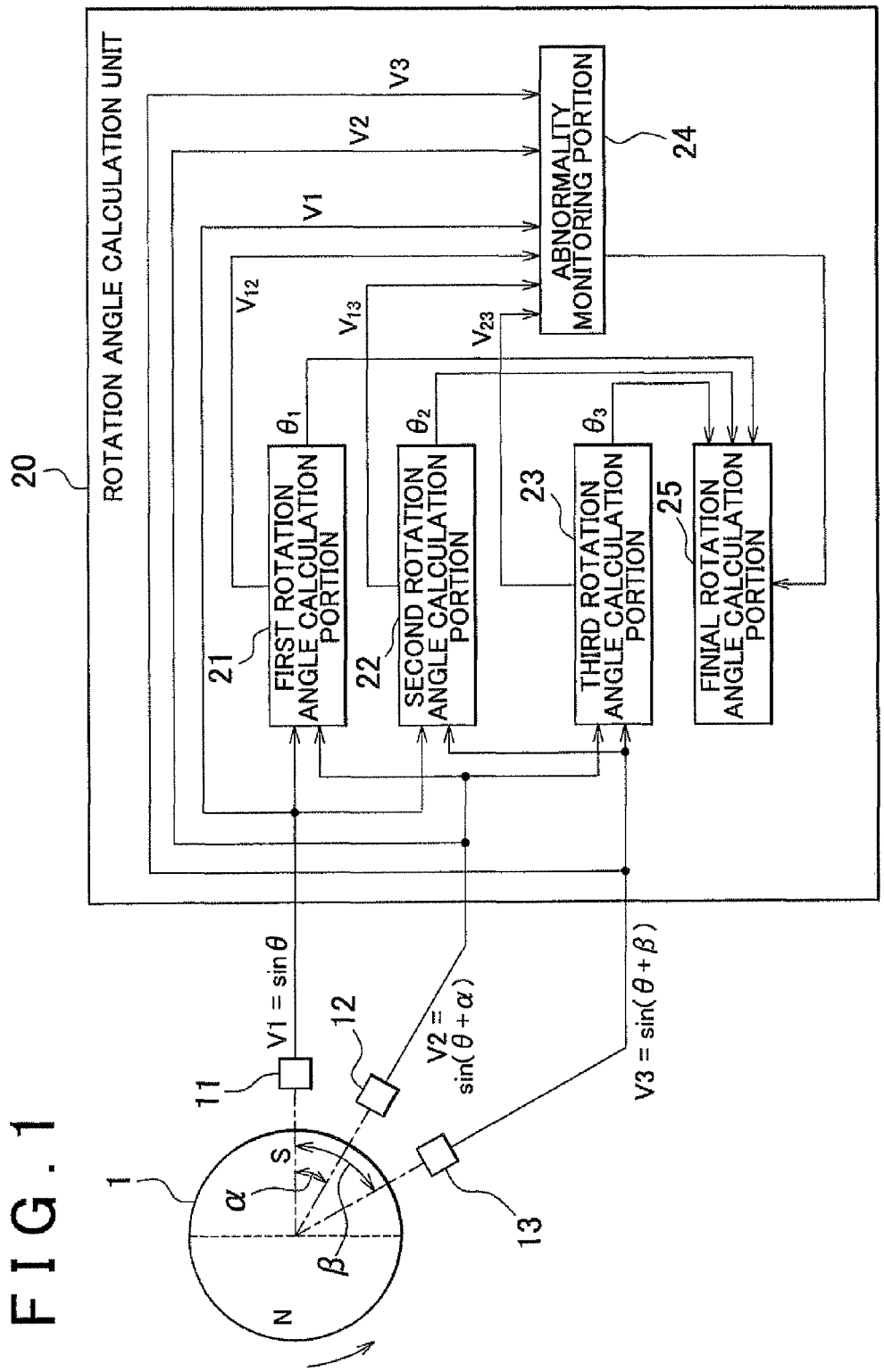

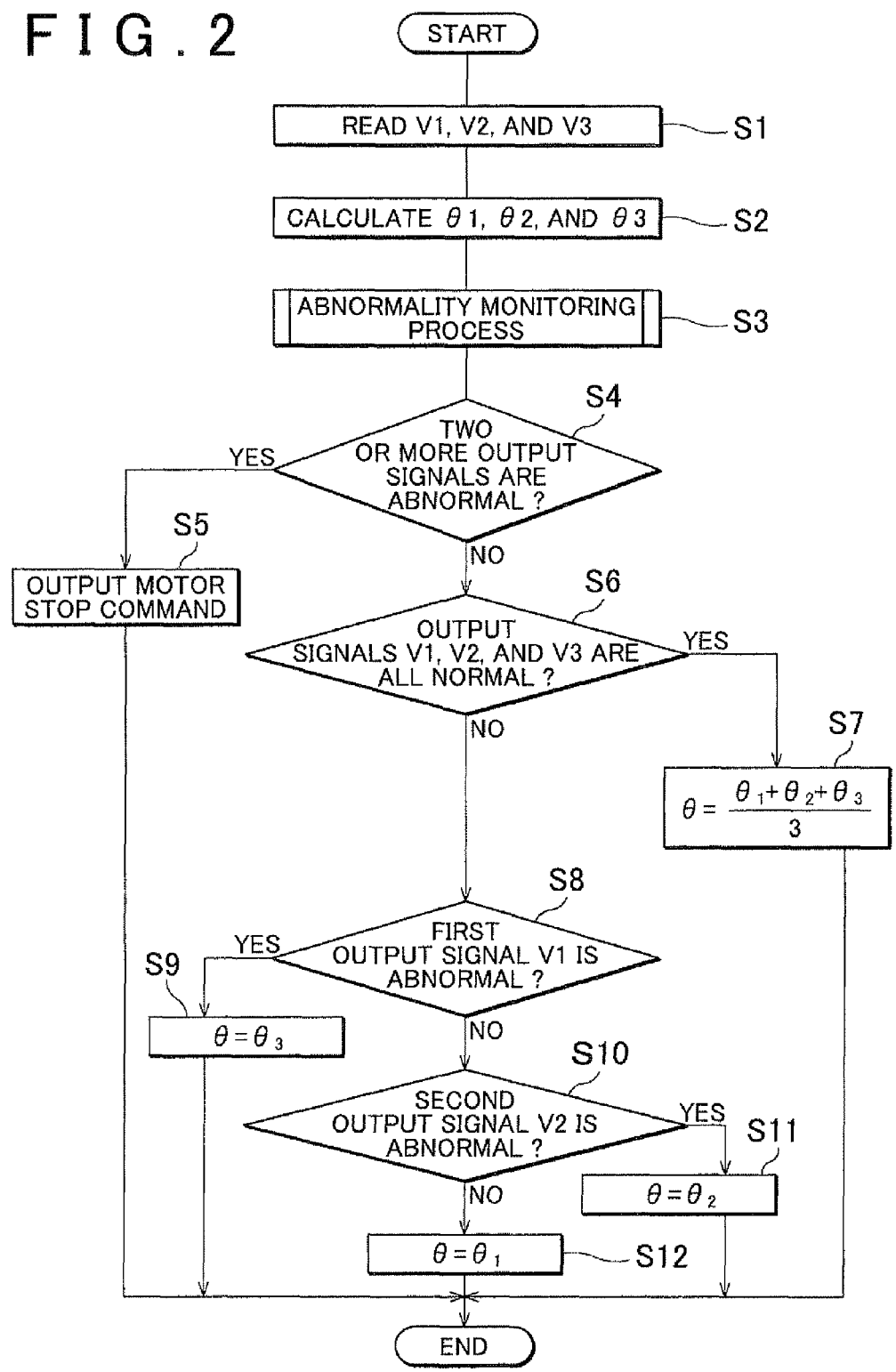

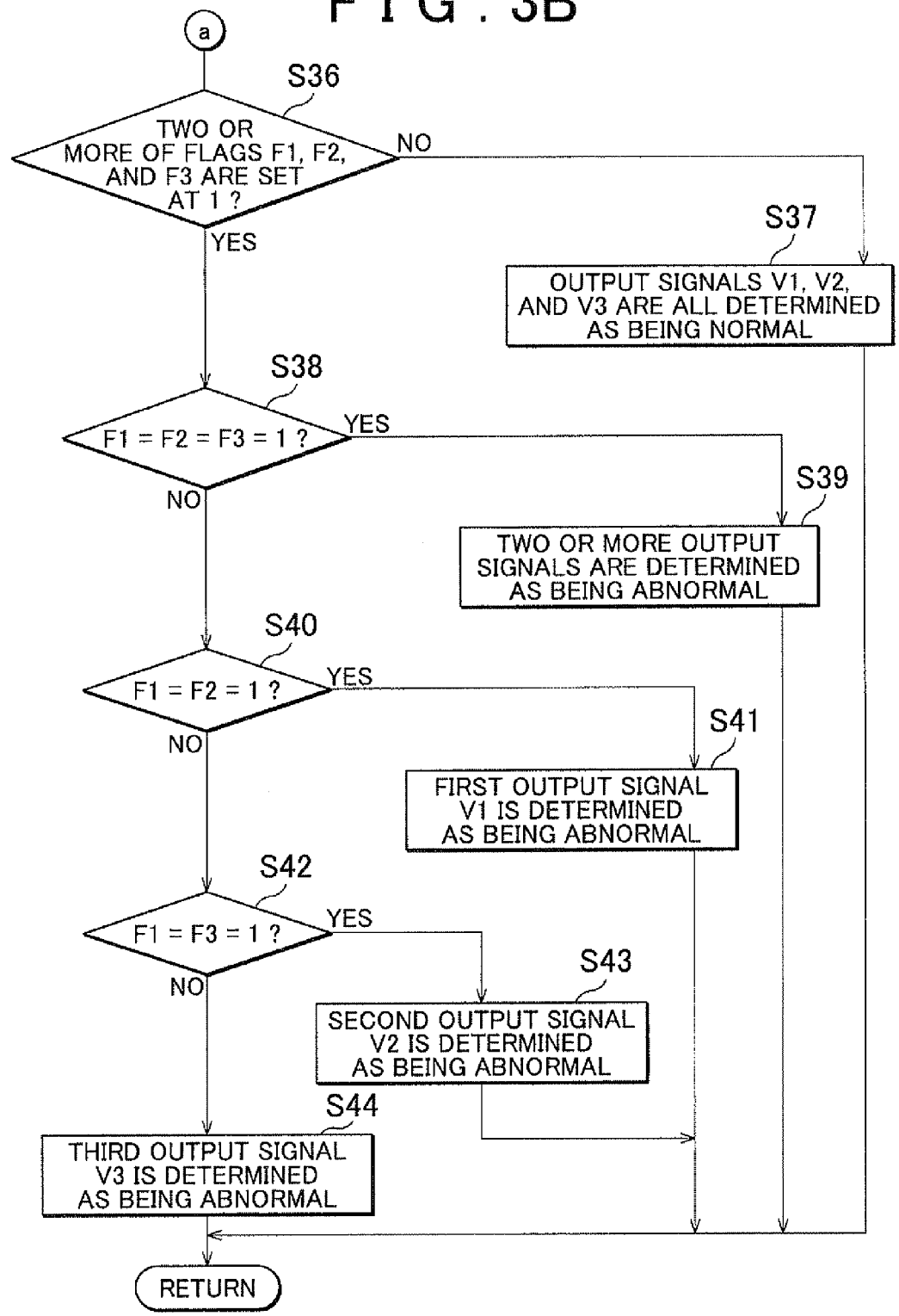

ROTOR ROTATION ANGLE

ROTATION ANGLE DETECTION DEVICE

INCORPORATION BY REFERENCE

The disclosure of Japanese Patent Application No. 2010-279440 filed on Dec. 15, 2010 including the specification, drawings and abstract, is incorporated herein by reference in its entirety.

BACKGROUND OF THE INVENTION

1. Field of the Invention

The invention relates to a rotation angle detection device that detects the rotation angle of a rotor.

2. Description of Related Art

A brushless motor used in, for example, an electric power steering system is controlled by applying currents to stator coils according to the rotation angle of a rotor. FIG. 4 shows, by way of example, a conventional rotation angle detection device. This rotation angle detection device includes a rotor 1 that has a magnet with two poles, that is, a north (N) pole and a south (S) pole, and two magnetic sensors 11 and 12 that are arranged such that the angular interval, about the rotation axis of the rotor 1, between the magnetic sensors 11 and 12 is 90 degrees. The magnetic sensors 11 and 12 output respective sinusoidal signals that have a phase difference of 90 degrees. The rotation angle detection device detects the rotation angle of the rotor 1 based on the two sinusoidal signals. With regard to such a rotation angle detection device, refer to, for example, Japanese Patent Application Publications No. 2008-241411, No. 2002-213944, No. 2010-110147, No. 2006-78392, and No. 2010-48760.

The direction indicated by the arrow in FIG. 4 is the normal rotation direction of the rotor 1. The rotation angle of the rotor 1 increases as the rotor 1 rotates in the normal direction, and decreases as the rotor 1 rotates in the reverse direction. As to the rotation angle $\theta$ of the rotor 1, the magnetic sensor 11 outputs an output signal V1 expressed as $V1 = A1 \cdot \sin \theta$, and the magnetic sensor 12 outputs an output signal V2 expressed as $V2 = A2 \cdot \sin(\theta + 90°) = A2 \cdot \cos \theta$. Note that A1 and A2 each represent an amplitude.

If the amplitudes A1 and A2 are both regarded as being equal to A, or the output signals V1 and V2 are normalized such that the amplitudes A1 and A2 are equal to a predetermined value A, the output signal V1 is expressed as $V1 = A \cdot \sin \theta$, and the output signal V2 is expressed as $V2 = A \cdot \cos \theta$. Further, if A is 1 (A=1), the output signal V1 is expressed as $V1 = \sin \theta$, and the output signal V2 is expressed as $V2 = \cos \theta$. Thus, for facilitating understanding on the following descriptions, the output signal V1 of the magnetic sensor 11 will be expressed as $V1 = \sin \theta$, and the output signal V2 of the magnetic sensor 12 will be expressed as $V2 = \sin(\theta + 90°) \cdot \cos \theta$. FIG. 5 illustrates how the output signals V1 and V2 of the respective magnetic sensors 11 and 12 change as the rotation angle $\theta$ of the rotor 1 changes.

The rotation angle $\theta$ of the rotor 1 may be determined according to, for example, Expression 1 shown below.

$$\theta = \tan^{-1}\left(\frac{\sin\theta}{\cos\theta}\right) \quad \text{Expression 1}$$
$$= \tan^{-1}\left(\frac{\sin\theta}{\sin(\theta + 90°)}\right)$$
$$= \tan^{-1}\left(\frac{V1}{V2}\right)$$

However, with the conventional rotation angle detection devices, such as the one described above, the rotation angle is not accurately calculated if one of the magnetic sensors comes to output abnormal output signals.

SUMMARY OF THE INVENTION

It is an object of the invention to provide a rotation angle detection device that, when one of multiple sensors outputs an abnormal signal, identifies the abnormal signal and accurately calculates a rotation angle based on the normal signals output from other sensors.

An aspect of the invention relates to a rotation angle detection device that includes a first sensor, a second sensor, and a third sensor that output, respectively, a first sinusoidal signal, a second sinusoidal signal, and a third sinusoidal signal, which are different in phase from each other, according to rotation of a rotor, and that detects a rotation angle of the rotor based on the output signals of the first sensor, the second sensor, and the third sensor. The rotation angle detection device includes: a determination unit that determines, based on the first sinusoidal signal, the second sinusoidal signal, and the third sinusoidal signal, whether the first sinusoidal signal, the second sinusoidal signal, and the third sinusoidal signal are each normal or abnormal; and a rotation angle calculation unit that calculates the rotation angle of the rotor based on at least two sinusoidal signals that are among the first sinusoidal signal, the second sinusoidal signal, and the third sinusoidal signal, and that are determined as being normal by the determination unit.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 1 is a view schematically showing the configuration of a rotation angle detection device according to an example embodiment of the invention;

FIG. 2 is a flowchart illustrating the procedure of a rotation angle calculation routine executed by the rotation angle detection device;

FIGS. 3A and 3B are flowcharts together illustrating the procedure of an abnormality monitoring process executed in step S3 in the rotation angle detection routine shown in FIG. 2;

DETAILED DESCRIPTION OF EMBODIMENTS

Figure 3A:
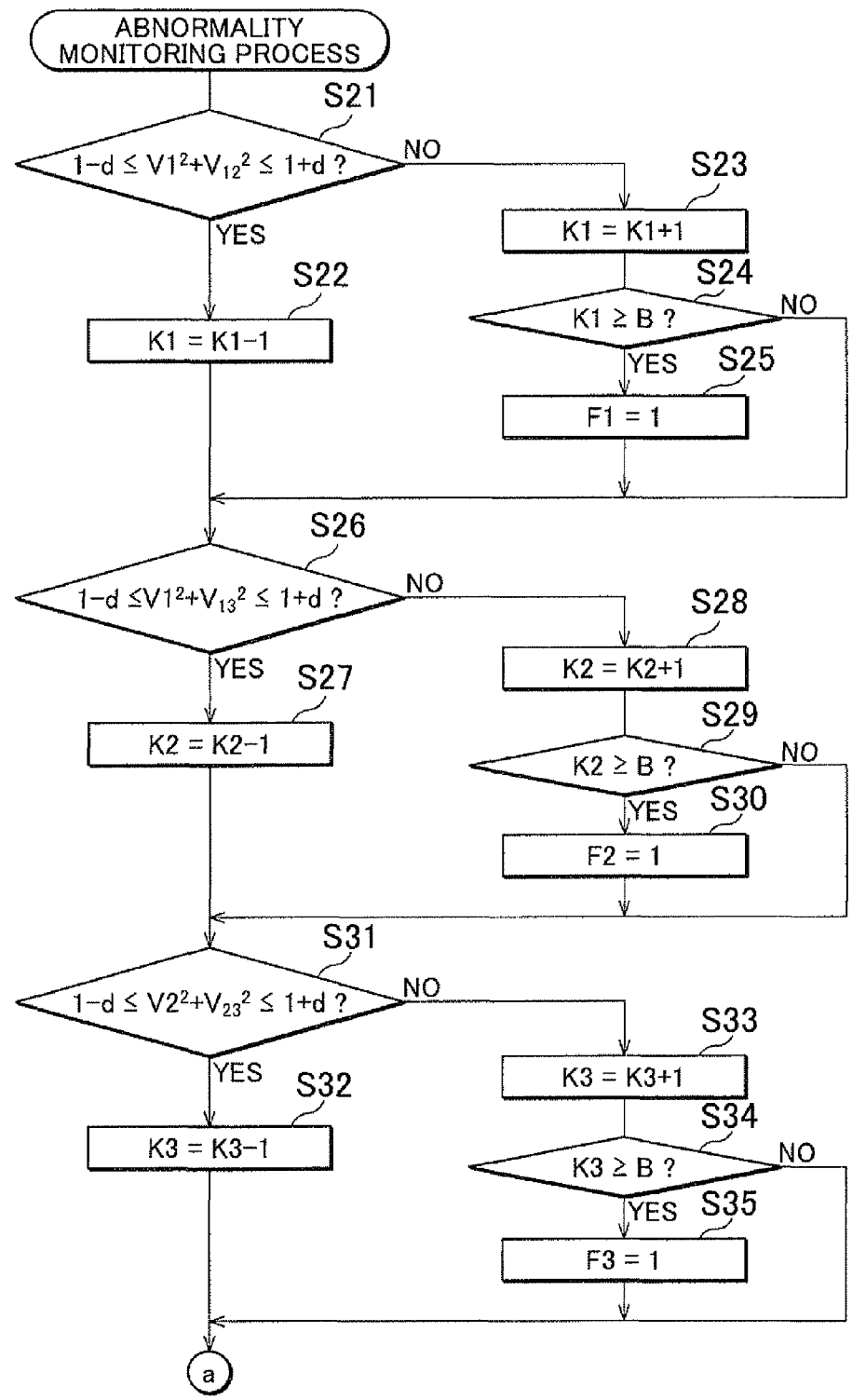
Figure 4:
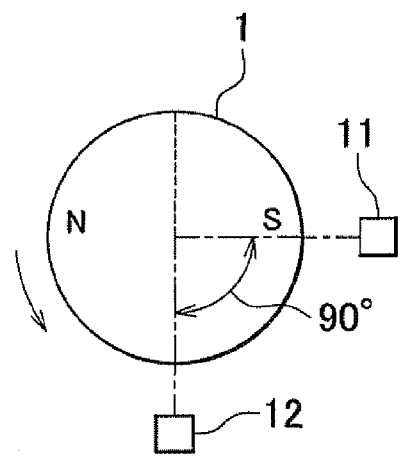
FIG. 4 is a schematic view for describing a rotation angle detection method implemented by a conventional rotation angle detection device.
Figure 5:
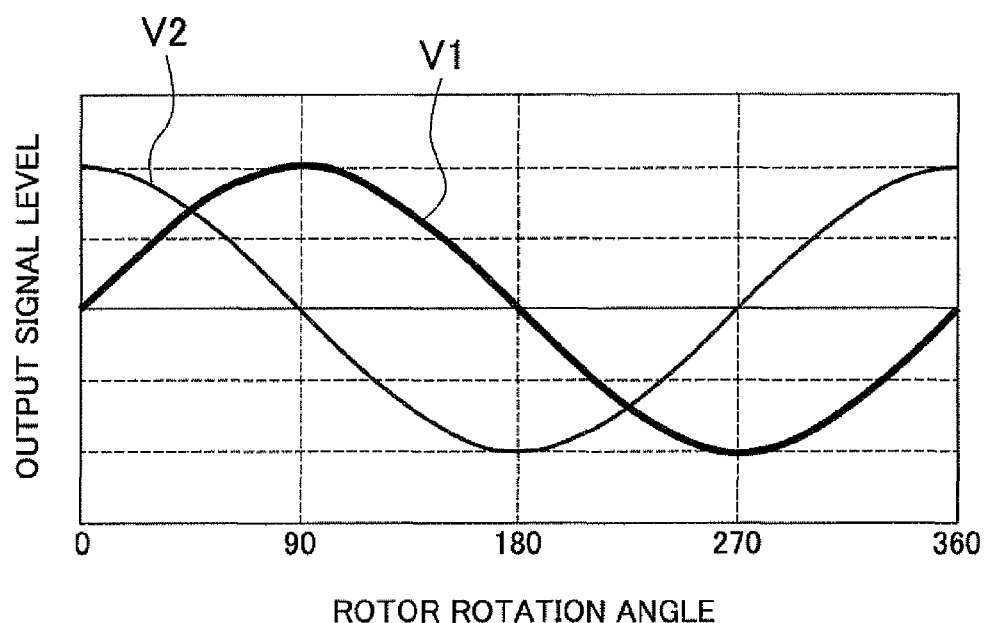
FIG. 5 is a chart schematically illustrating output signals of two magnetic sensors arranged such that the angular interval therebetween is 90 degrees.

Hereafter, an example embodiment of the invention will be described in detail with reference to the accompanying drawings. In the example embodiment, the invention is embodied as a rotation angle detection device that detects the rotation angle of a rotor of a brushless motor. FIG. 1 is a view schematically showing the configuration of the rotation angle detection device according to the example embodiment of the invention. The rotation angle detection device may be used, for example, to detect the rotation angle of a rotor of a brushless motor included in an electric power steering system. The rotation angle detection device has, for example, a detection rotor 1 that rotates as the brushless motor runs (will hereinafter be referred to as "rotor 1"). The rotor 1 has a magnet with two poles, that is, a north (N) pole and a south (S) pole. Three magnetic sensors 11, 12, and 13 are provided around the rotor 1 at given intervals along the circumferential direction of the rotor 1. It is to be noted that the three magnetic sensors 11, 12, and 13 will be referred to as "first magnetic sensor 11", "second magnetic sensor 12", and "third magnetic sensor 13", respectively, where necessary. These magnetic sensors 11, 12, and 13 may each be, for example, a magnetic sensor that includes an element of which the electric characteristics change under the influence of the magnetic field, such as a Hall element and a magnetoresistance element (MR element).

The angular interval, about the rotation axis of the rotor 1, between the first magnetic sensor 11 and the second magnetic sensor 12 is α, which is set to, for example, 30 degrees in this example embodiment. The angular interval, about the rotation axis of the rotor 1, between the first magnetic sensor 11 and the third magnetic sensor 13 is β, which is larger than α and is set to, for example, 60 degrees in this example embodiment. As a result, the angular interval, about the rotation axis of the rotor 1, between the second magnetic sensor 12 and the third magnetic sensor 13 is (β−α), which is 30 degrees in this example embodiment.

In this example embodiment, the direction indicated by the arrow in FIG. 1 is the normal rotation direction of the rotor 1. The rotation angle of the rotor 1 increases as the rotor 1 rotates in the normal direction, and decreases as the rotor 1 rotates in the reverse direction. As to the rotation angle θ of the rotor 1, the first magnetic sensor 11 outputs an output signal V1 expressed as V1=A1·sin θ, and the second magnetic sensor 12 outputs an output signal V2 expressed as V2=A2·sin(θ+α), and the third magnetic sensor 13 outputs an output signal V3 expressed as V3=A3·sin(θ+β). Note that A1, A2, and A3 each represent an amplitude.

If all the amplitudes A1, A2, and A3 are regarded as being equal to A, or the output signals V1, V2, and V3 are normalized such that the amplitudes A1, A2, and A3 are equal to a predetermined value A, the output signals V1, V2, and V3 are expressed as A·sin θ, A·sin(θ+α), and A·sin(θ+β), respectively. Further, if A is 1 (A=1), the output signal V1 is expressed as sin θ, the output signal V2 is expressed as sin(θ+α), and the output signal V3 is expressed as sin(θ+β). Thus, for facilitating understanding on the following descriptions, the output signal V1 of the first magnetic sensor 11 will be expressed as V1=sin θ, and the output signal V2 of the second magnetic sensor 12 will be expressed as V2=sin(θ+α), and the output signal V3 of the third magnetic sensor 13 will be expressed as V3=sin(θ+β).

The output signal V1 of the first magnetic sensor 11, the output signal V2 of the second magnetic sensor 12, and the output signal V3 of the third magnetic sensor 13 are all input into a rotation angle calculation unit 20. The rotation angle calculation unit 20 calculates the rotation angle θ of the rotor 1 based on the output signal V1 of the first magnetic sensor 11, the output signal V2 of the second magnetic sensor 12, and the output signal V3 of the third magnetic sensor 13. It is to be noted that the output signal V1 of the first magnetic sensor 11, the output signal V2 of the second magnetic sensor 12, and the output signal V3 of the third magnetic sensor 13 will hereinafter be referred to as "first output signal V1", "second output signal V2", and "third output signal V3", respectively, where necessary.

The rotation angle calculation unit 20 is constituted of, for example, a microcomputer that includes a CPU (Central Processing Unit), memories (ROM, RAM, etc.), and so on. The rotation angle calculation unit 20 serves as multiple function processing portions when the CPU executes given programs stored in the ROM. The multiple function processing portions include a first rotation angle calculation portion 21 (an example of "first rotation angle calculation unit"), a second rotation angle calculation portion 22 (an example of "second rotation angle calculation unit"), a third rotation angle calculation portion 23 (an example of "third rotation angle calculation unit"), an abnormality monitoring portion 24 (an example of "determination unit"), and a final rotation angle calculation portion 25 (an example of "fourth rotation angle calculation unit").

The first rotation angle calculation portion 21 calculates a first rotation angle $\theta_1$ that corresponds to the rotation angle of the rotor 1, based on the first output signal V1 and the second output signal V2. More specifically, the first rotation angle calculation portion 21 first generates, based on the first output signal V1(=sin θ) and the second output signal V2(=sin(θ+α)), a signal $V_{12}$(=sin(θ+90°)=cos θ) that is different in phase from the first output signal V1 by 90 degrees. More specifically, the first rotation angle calculation portion 21 generates the signal $V_{12}$ according to Expression 2 shown below.

$$V_{12} = \cos\theta \quad (2)$$
$$= \frac{\sin(\theta + \alpha) - \sin\theta \cdot \cos\alpha}{\sin\alpha}$$
$$= \frac{V2 - V1 \cdot \cos\alpha}{\sin\alpha}$$

As is known from Expression 2, the first rotation angle calculation portion 21 generates the signal $V_{12}$(=cos θ) based on the first output signal V1(=sin θ), the second output signal V2(=sin(θ+α)), cos α, and sin α. Note that cos α and sin α are stored in a given memory in advance, and Expression 2 is derived through an expression obtained by developing sin(θ+α) using a trigonometric addition formula. Then, the first rotation angle calculation portion 21 calculates the first rotation angle $\theta_1$ by using the signal $V_{12}$(=cos θ) and the first output signal V1(=sin θ), according to Expression 3 shown below.

$$\theta = \tan^{-1}\frac{\sin\theta}{\cos\theta} \quad (3)$$
$$= \tan^{-1}\frac{V1}{V_{12}}$$

The second rotation angle calculation portion 22 calculates a second rotation angle $\theta_2$ that corresponds to the rotation angle of the rotor 1, based on the first output signal V1 and the third output signal V3. More specifically, the second rotation angle calculation portion 22 first generates, based on the first output signal V1(=sin θ) and the third output signal V3(=sin(θ+β)), a signal $V_{13}$(=sin(θ+90°))=cos θ) that is different in phase from the first output signal V1 by 90 degrees. More specifically, the second rotation angle calculation portion 22 generates the signal $V_{13}$ according to Expression 4 shown below.

$$V_{13} = \cos\theta \quad (4)$$
$$= \frac{\sin(\theta + \beta) - \sin\theta \cdot \cos\beta}{\sin\beta}$$
$$= \frac{V3 - V1 \cdot \cos\beta}{\sin\beta}$$

As is known from Expression 4, the second rotation angle calculation portion 22 generates the signal $V_{13}(=\cos\theta)$ based on the first output signal $V1(=\sin\theta)$, the third output signal $V3(=\sin(\theta+\beta))$, $\cos\beta$, and $\sin\beta$. Note that $\cos\beta$ and $\sin\beta$ are stored in the memory in advance, and Expression 4 is, like Expression 2 above, derived through an expression obtained by developing $\sin(\theta+\beta)$ using a trigonometric addition formula.

Then, the second rotation angle calculation portion 22 calculates the second rotation angle $\theta_2$ by using the signal $V_{13}(=\cos\theta)$ and the first output signal $V1(=\sin\theta)$, according to Expression 5 shown below.

$$\theta_2 = \tan^{-1}\frac{\sin\theta}{\cos\theta} \qquad (5)$$
$$= \tan^{-1}\frac{V1}{V_{13}}$$

The third rotation angle calculation portion 23 calculates a third rotation angle $\theta_3$ that corresponds to the rotation angle of the rotor 1, based on the second output signal V2 and the third output signal V3. The concept of a method of calculating the third rotation angle $\theta_3$ using the third rotation angle calculation portion 23 will be described. First, the third rotation angle calculation portion 23 calculates, based on the second output signal V2 and the third output signal V3, a rotation angle $\theta_3'(=\theta+\alpha)$ that is advanced with respect to (larger than) the rotation angle $\theta$ of the rotor 1 by $\alpha$. Then, the third rotation angle calculation portion 23 calculates the third rotation angle $\theta_3$ by subtracting $\alpha$ from the calculated rotation angle $\theta_3'$.

More specifically, the third rotation angle calculation portion 23 first generates, based on the second output signal $V2(=\sin(\theta+\alpha))$ and the third output signal $V3(=\sin(\theta+\beta))$, a signal $V_{23}(=\sin(\theta+\alpha+90°))$ that is different in phase from the second output signal V2 by 90 degrees. If the second output signal V2 is expressed, using $\theta'$ that is $\theta+\alpha$, as a sinusoidal signal $\sin\theta'$, and the third output signal V3 is expressed, using $\theta'$, as a sinusoidal signal $\sin(\theta'+(\beta-\alpha))$ that is advanced, by $(\beta-\alpha)$, in phase with respect to the sinusoidal signal $\sin\theta'$, the signal $V_{23}(=\sin(\theta'+90°)=\cos\theta')$ that is different in phase from the sinusoidal signal $\sin\theta'$ by 90 degrees is obtained in the same method as that used by the first rotation angle calculation portion 21.

More specifically, the third rotation angle calculation portion 23 generates the signal $V_{23}$ according to Expression 6 shown below.

$$\begin{aligned}V_{23} &= \cos\theta' \qquad (6)\\ &= \frac{\sin(\theta'+(\beta-\alpha)) - \sin\theta' \cdot \cos(\beta-\alpha)}{\sin(\beta-\alpha)}\\ &= \frac{\sin(\theta+\beta) - \sin(\theta+\alpha)\cdot\cos(\beta-\alpha)}{\sin(\beta-\alpha)}\\ &= \frac{V3 - V2\cdot\cos(\beta-\alpha)}{\sin(\beta-\alpha)}\end{aligned}$$

As is known from Expression 6, the third rotation angle calculation portion 23 generates the signal $V_{23}(=\cos\theta')$ based on the second output signal $V2(=\sin(\theta+\alpha))$, the third output signal $V3(\sin(\theta+\beta))$, $\cos(\beta-\alpha)$, and $\sin(\beta-\alpha)$. Note that $\cos(\beta-\alpha)$ and $\sin(\beta-\alpha)$ are stored in the memory in advance. Then, the third rotation angle calculation portion 23 calculates the rotation angle $\theta_3'$ by using the signal $V_{23}(=\cos\theta')$ and the second output signal $V2(=\sin\theta'=\sin(\theta+\alpha))$, according to Expression 7 shown below.

$$\begin{aligned}\theta_3' &= \tan^{-1}\frac{\sin\theta'}{\cos\theta'} \qquad (7)\\ &= \tan^{-1}\frac{\sin(\theta+\alpha)}{\cos\theta'}\\ &= \tan^{-1}\frac{V2}{V_{23}}\end{aligned}$$

Subsequently, the third rotation angle calculation portion 23 calculates the third rotation angle $\theta_3$ according to Expression 8 shown below.

$$\theta_3=\theta_3'-\alpha \qquad \text{Expression 8}$$

Note that $\alpha$ is stored in the memory in advance. The abnormality monitoring portion 24 determines whether each of the first output signal V1, the second output signal V2, and the third output signal V3 is normal or abnormal, based on the first output signal V1, the second output signal V2, and the third output signal V3. More specifically, the abnormality monitoring portion 24 determines whether the first output signal V1, the second output signal V2, and the third output signal V3 are normal or abnormal based on the first output signal V1, the second output signal V2, and the third output signal V3, and the signal $V_{12}$ calculated according to Expression 2, the signal $V_{13}$ calculated according to Expression 4, and the signal $V_{23}$ calculated according to Expression 6.

In other words, the abnormality monitoring portion 24 detects malfunctions of the respective magnetic sensors 11, 12, and 13. If the magnetic sensors 11, 12, and 13 malfunction, the output signals V1, V2, and V3 are fixed to, for example, 0 (zero), the upper limits thereof, or the lower limits thereof, respectively. The concept of the normality-abnormality determination made by the abnormality monitoring portion 24 will be described. The first output signal V1 is expressed as $\sin\theta$, and the signal $V_{12}$, which is generated based on the first output signal V1 and the second output signal V2, is expressed as $\cos\theta$. Because $\sin\theta^2+\cos\theta^2$ is 1 ($\sin\theta^2+\cos\theta^2=1$), if the first output signal V1 and the second output signal V2 are normal, the condition that $V1^2+V_{12}^2=1$ should be satisfied.

Thus, if the value of $V1^2+V_{12}^2$ is within the range of $1\pm d$ ($d\geq 0$), the abnormality monitoring portion 24 determines that the first output signal V1 and the second output signal V2 are both normal. If the value of $V1^2+V_{12}^2$ is out of the range of $1\pm d$, on the other hand, the abnormality monitoring portion 24 determines that there is a possibility that at least one of the first output signal V1 and the second output signal V2 may be presently abnormal. However, it is to be noted that in this example embodiment, the process of determining whether the value of $V1^2+V_{12}^2$ is within the range of $1\pm d$ is periodically executed at given calculation cycles, and it is determined that there is a possibility that at least one of the first output signal V1 and the second output signal V2 may be presently abnormal, if a state where the value of $V1^2+V_{12}^2$ is out of the range of $1\pm d$ is successively detected a predetermined number of times or more. In the following, the result of the determination described above will be referred to as "first determination result" where necessary. Note that d is a constant that is set to a value within a range, for example, from 0 to 0.1. When d is set to 0, therefore, it is determined whether the value of $V1^2+V_{12}^2$ is 1. When d is set to 0.1, it is determined whether the value of $V1^2+V_{12}^2$ is within a range from 0.9 to 1.1.

Further, the first output signal V1 is expressed as sin θ, and the signal $V_{13}$, which is generated based on the first output signal V1 and the third output signal V3, is expressed as cos θ. Because $\sin^2 θ + \cos^2 θ$ is 1 ($\sin^2 θ + \cos^2 θ = 1$), if the first output signal V1 and the third output signal V3 are normal, the condition that $V1^2 + V_{13}^2 = 1$ should be satisfied. Therefore, the abnormality monitoring portion 24 determines that the first output signal V1 and the third output signal V3 are both normal if the value of $V1^2 + V_{13}^2$ is within the range of 1±d (d≥0), and determines that there is a possibility that at least one of the first output signal V1 and the third output signal V3 may be presently abnormal if the value of $V1^2 + V_{13}^2$ is out of the range of 1±d. However, it is to be noted that in this example embodiment, the process of determining whether the value of $V1^2 + V_{13}^2$ is within the range of 1±d is periodically executed at given calculation cycles, and it is determined that there is a possibility that at least one of the first output signal V1 and the third output signal V3 may be presently abnormal, if a state where the value of $V1^2 + V_{13}^2$ is out of the range of 1±d is successively detected a predetermined number of times or more. In the following, the result of the determination described above will be referred to as "second determination result" where necessary.

Further, as mentioned earlier, if θ' is θ+α (θ'=θ+α), the second output signal V2 is expressed as sin θ'. The signal $V_{23}$, which is generated based on the second output signal V2 and the third output signal V3, is expressed as cos θ'. Because $\sin^2 θ' + \cos^2 θ'$ is 1 ($\sin^2 θ' + \cos^2 θ' = 1$), if the second output signal V2 and the third output signal V3 are normal, the condition that $V2^2 + V_{23}^2 = 1$ should be satisfied. For this reason, the abnormality monitoring portion 24 determines that the second output signal V2 and the third output signal V3 are normal if the value of $V2^2 + V_{23}^2$ is within the range of 1±d (d≥0), and determines that there is a possibility that at least one of the second output signal V2 and V3 may be presently abnormal if the value of $V2^2 + V_{23}^2$ is out of the range of 1±d. However, it is to be noted that in this example embodiment, the process of determining whether the value of $V2^2 + V_{23}^2$ is within the range of 1±d is periodically executed at given calculation cycles, and it is determined that there is a possibility that at least one of the second output signal V2 and the third output signal V3 may be presently abnormal, if a state where the value of $V2^2 + V_{23}^2$ is out of the range of 1±d is successively detected a predetermined number of times or more. In the following, the result of the determination described above will be referred to as "third determination result" where necessary.

Then, the abnormality monitoring portion 24 determines whether each of the first output signal V1, the second output signal V2, and the third output signal V3 is normal or abnormal, based on the first to third determination results. The result of this determination made by the abnormality monitoring portion 24 will be referred to as "final determination result" where necessary. Table 1 shown below indicates the relations between the final determination results and the first to third determination results.

TABLE 1

| First determination result | Second determination result | Third determination result | Final determination result |
| --- | --- | --- | --- |
| Normal | Normal | Normal | V1, V2, and V3 are all normal |
| Abnormal | Abnormal | Abnormal | At least two output signals are abnormal |
| Abnormal | Abnormal | Normal | V1 is abnormal |
| Abnormal | Normal | Abnormal | V2 is abnormal |
| Normal | Abnormal | Abnormal | V3 is abnormal |

As shown in Table 1 above, if the first to third determination results are all "normal" (i.e., results indicating there is no possibility of an abnormality), the abnormality monitoring portion 24 determines that the output signals V1, V2, and V3 are all normal. On the other hand, if the first to third determination results are all "abnormal" (i.e., results indicating that there is a possibility of an abnormality), the abnormality monitoring portion 24 determines that at least two of the output signals V1, V2, and V3 are abnormal. In this case, the rotation angle can not be calculated, and therefore the motor is stopped.

Next, if the first determination result and the second determination result are "abnormal" but the third determination result is "normal", the abnormality monitoring portion 24 determines that the first output signal V1 is abnormal and the second output signal V2 and the third output signal V3 are normal. If the first determination result and the third determination result are "abnormal" but the second determination result is "normal", the abnormality monitoring portion 24 determines that the second output signal V2 is abnormal and the first output signal V1 and the third output signal V3 are normal. Next, if the second determination result and the third determination result are "abnormal" but the first determination result is "normal", the abnormality monitoring portion 24 determines that the third output signal V3 is abnormal and the first output signal V1 and the second output signal V2 are normal.

The final rotation angle calculation portion 25 calculates a final rotation angle θ based on the final determination result obtained by the abnormality monitoring portion 24, the first rotation angle $θ_1$ calculated by the first rotation angle calculation portion 21, the second rotation angle $θ_2$ calculated by the second rotation angle calculation portion 22, and the third rotation angle $θ_3$ calculated by the third rotation angle calculation portion 23. Specifically, the final rotation angle calculation portion 25 calculates the final rotation angle θ based on the rotation angles that are among the first rotation angle $θ_1$, the second rotation angle $θ_2$, and the third rotation angle $θ_3$, and that are calculated based on the combination of the output signals determined as being normal by the abnormality monitoring portion 24.

More specifically, if the abnormality monitoring portion 24 determines that the output signals V1, V2, and V3 are all normal, the final rotation angle calculation portion 25 calculates the final rotation angle θ according to, for example, Expression 9 shown below. That is, the final rotation angle calculation portion 25 determines the average of the first to third rotation angles $θ_1$, $θ_2$, and $θ_3$ as the final rotation angle θ.

$$θ = (θ_1 + θ_2 + θ_3)/3 \qquad \text{Expression 9}$$

Meanwhile, if the abnormality monitoring portion 24 determines that the output signals V1, V2, and V3 are all normal, the final rotation angle calculation portion 25 may determine the median of the first rotation angle $θ_1$, the second rotation angle θ₂, and the third rotation angle θ₃ as the final rotation angle θ. Further, if the abnormality monitoring portion 24 determines that the output signals V1, V2, and V3 are all normal, the final rotation angle calculation portion 25 may determine, as the final rotation angle θ, the average of the median of the first rotation angle θ₁, the second rotation angle θ₂, and the third rotation angle θ₃, and another one of the rotation angles θ₁, θ₂, and θ₃ which is closer to the median. Further, if the abnormality monitoring portion 24 determines that the output signals V1, V2, and V3 are all normal, the final rotation angle calculation portion 25 may determine any one of the first rotation angle θ₁, the second rotation angle θ₂, and the third rotation angle θ₃ as the final rotation angle θ.

Next, if the abnormality monitoring portion 24 determines that the first output signal V1 is abnormal and the second output signal V2 and the third output signal V3 are normal, the final rotation angle calculation portion 25 determines the third rotation angle θ₃, which is calculated based on the second output signal V2 and the third output signal V3, as the final rotation angle θ. If the abnormality monitoring portion 24 determines that the second output signal V2 is abnormal and the first output signal V1 and the third output signal V3 are normal, the final rotation angle calculation portion 25 determines the second rotation angle θ₂, which is calculated based on the first output signal V1 and the third output signal V3, as the final rotation angle θ.

If the abnormality monitoring portion 24 determines that the third output signal V3 is abnormal and the first output signal V1 and the second output signal V2 are normal, the final rotation angle calculation portion 25 determines the first rotation angle θ₁, which is calculated based on the first output signal V1 and the second output signal V2, as the final rotation angle θ. FIG. 2 is a flowchart illustrating the procedure of the rotation angle calculation routine executed by the rotation angle calculation unit 20.

The rotation angle calculation routine is periodically executed at given calculation cycles. As shown in FIG. 2, first, the rotation angle calculation unit 20 reads the first output signal V1(=sin θ) of the first magnetic sensor 11, the second output signal V2(=sin(θ+α)) of the second magnetic sensor 12, and the third output signal V3(=sin(θ+β)) of the third magnetic sensor 13 (step S1). Then, the first rotation angle calculation portion 21, the second rotation angle calculation portion 22, and the third rotation angle calculation portion 23 calculate the first rotation angle θ₁, the second rotation angle θ₂, and the third rotation angle θ₃, respectively (step S2). That is, at this time, the first rotation angle calculation portion 21 calculates the first rotation angle θ₁ by using the output signals V1 and V2, which are read in step S1, and the values of sin α and cos α, which are stored in the memory, according to Expressions 2 and 3. The second rotation angle calculation portion 22 calculates the second rotation angle θ₂ by using the output signals V1 and V3, which are read in step S1, and the values of sin β and cos β, which are stored in the memory, according to Expressions 4 and 5. The third rotation angle calculation portion 23 calculates the third rotation angle θ₃ by using the output signals V2 and V3, which are read in step S1, and the values of α, sin(β−α), and cos(β−α), which are stored in the memory, according to Expressions 6, 7, and 8.

Next, the abnormality monitoring portion 24 executes an abnormality monitoring process (step S3), which will be described later in detail. If it is determined in the abnormality monitoring process that two or more of the output signals are abnormal (step S4: YES), the abnormality monitoring portion 24 outputs a motor stop command (step S5), so that the motor is stopped. In this case, the rotation angle calculation routine is discontinued.

If it is determined in the abnormality monitoring process that all the output signals V1, V2, and V3 are normal (step S6: YES), the final rotation angle calculation portion 25 calculates the final rotation angle θ based on the first rotation angle θ₁, the second rotation angle θ₂, and the third rotation angle θ₃ (step S7). For example, at this time, the final rotation angle calculation portion 25 calculates the average of the first rotation angle θ₁, the second rotation angle θ₂, and the third rotation angle θ₃ according to Expression 9 above, and determines the calculated average as the final rotation angle θ. Thereafter, the present cycle of the rotation angle calculation routine is finished.

If the abnormality monitoring portion 24 determines that the first output signal V1 is abnormal (step S8: YES), the final rotation angle calculation portion 25 determines the third rotation angle θ₃ as the final rotation angle θ (step S9), after which the present cycle of the rotation angle calculation routine is finished. If the abnormality monitoring portion 24 determines that the second output signal V2 is abnormal (step S10: YES), the final rotation angle calculation portion 25 determines the second rotation angle θ₂ as the final rotation angle θ (step S11), after which the present cycle of the rotation angle calculation routine is finished.

If the abnormality monitoring portion 24 determines that the third output signal V3 is abnormal (step S10: NO), the final rotation angle calculation portion 25 determines the first rotation angle θ₁ as the final rotation angle θ (step S12), after which the present cycle of the rotation angle calculation routine is finished. The flowcharts in FIGS. 3A and 3B together illustrate the procedure of the abnormality monitoring process in step S3 in the rotation angle calculation routine illustrated in FIG. 2.

As shown in FIG. 3A, first, the abnormality monitoring portion 24 determines whether the value of $V1^2 + V_{12}^2$ is within the range of 1±d (d≥0) (step S21). More specifically, at this time, the abnormality monitoring portion 24 determines whether a first condition represented by Expression 10 shown below is satisfied.

$$1 - d \leq V1^2 + V_{12}^2 \leq 1 + d \tag{10}$$

where $$V_{12} = \frac{V2 - V1 \cdot \cos\alpha}{\sin\alpha}$$

If the value of $V1^2 + V_{12}^2$ is within the range of 1±d (i.e., if the first condition is satisfied) (step S21: YES), the abnormality monitoring portion 24 decrements a first count value K1 by 1 only (−1) (step S22). Then, the abnormality monitoring portion 24 proceeds to step S26. It is to be noted that the initial value of the first count value K1 is 0, and the first count value K1 is an integer of equal to or larger than 0 and does not become a negative value. Therefore, even if the first count value K1 is decremented in step S22, the first count value K1 does not become smaller than 0.

On the other hand, referring back to step S21, if it is determined in this step that the value of $V1^2 + V_{12}^2$ is out of the range of 1±d (i.e., if the first condition is not satisfied) (step S21: NO), the abnormality monitoring portion 24 increments the first count value K1 by 1 only (+1) (step S23). Then, the abnormality monitoring portion 24 determines whether the first count value K1 is equal to or larger than a predetermined threshold B (step S24). If the first count value K1 is smaller than the threshold B (step S24: NO), the abnormality monitoring portion 24 proceeds to step S26.

On the other hand, if it is determined that the first count value K1 is equal to or larger than the threshold B (step S24: YES), the abnormality monitoring portion 24 sets a first flag F1 to 1 (F1=1) (step S25), and then proceeds to step S26. The first flag F1 is a flag for storing the first determination result, and its initial value is 0 (F1=0). In step S26, the abnormality monitoring portion 24 determines whether the value of $V1^2 + V_{13}^2$ is within the range of 1±d (d≥0). More specifically, at this time, the abnormality monitoring portion 24 determines whether a second condition represented by Expression 11 shown below is satisfied.

$$1 - d \leq V1^2 + V_{13}^2 \leq 1 + d \quad (11)$$

where $$V_{13} = \frac{V3 - V1 \cdot \cos\beta}{\sin\beta}$$

If the value of $V1^2 + V_{13}^2$ is within the range of 1±d (i.e., if the second condition is satisfied) (step S26: YES), the abnormality monitoring portion 24 decrements a second count value K2 by 1 only (−1) (step S27), and then proceeds to step S31. It is to be noted that the initial value of the second count value K2 is 0, and the second count value K2 is an integer of equal to or larger than 0 and does not become a negative value.

If it is determined in step S26 that the value of $V1^2 + V_{13}^2$ is out of the range of 1±d (i.e., if the second condition is not satisfied) (step S26: NO), the abnormality monitoring portion 24 increments the second count value K2 by 1 only (+1) (step S28). Then, the abnormality monitoring portion 24 determines whether the second count value K2 is equal to or larger than the threshold B (step S29). If the second count value K2 is smaller than the threshold B (step S29: NO), the abnormality monitoring portion 24 proceeds to step S31.

On the other hand, if it is determined that the second count value K2 is equal to or larger than the threshold B (step S29: YES), the abnormality monitoring portion 24 sets a second flag F2 to 1 (F2=1) (step S30), and then proceeds to step S31. The second flag F2 is a flag for storing the second determination result, and its initial value is 0 (F2=0). In step S31, the abnormality monitoring portion 24 determines whether the value of $V2^2 + V_{23}^2$ is within the range of 1±d (d≥0). More specifically, at this time, the abnormality monitoring portion 24 determines whether a third condition represented by Expression 12 shown below is satisfied.

$$1 - d \leq V2^2 + V_{23}^2 \leq 1 + d \quad (12)$$

where $$V_{23} = \frac{V3 - V2 \cdot \cos(\beta - \alpha)}{\sin(\beta - \alpha)}$$

If the value of $V2^2 + V_{23}^2$ is within the range of 1±d (i.e., if the third condition is satisfied) (step S31: YES), the abnormality monitoring portion 24 decrements a third count value K3 by 1 only (−1) (step S32), and then proceeds to step S36. It is to be noted that the initial value of the third count value K3 is 0, and the third count value K3 is an integer of equal to or larger than 0 and does not become a negative value.

On the other hand, if it is determined in step S31 that the value of $V2^2 + V_{23}^2$ is out of the range of 1±d (i.e., if the third condition is not satisfied) (step S31: NO), the abnormality monitoring portion 24 increments the third count value K3 by 1 only (+1) (step S33). Then, the abnormality monitoring portion 24 determines whether the third count value K3 is equal to or larger than the threshold B (step S34). If the third count value K3 is smaller than the threshold B (step S34: NO), the abnormality monitoring portion 24 proceeds to step S36.

On the other hand, if it is determined that the third count value K3 is equal to or larger than the threshold B (step S34: YES), the abnormality monitoring portion 24 sets a third flag F3 to 1 (F3=1) (step S35), and then proceeds to step S36. The third flag F3 is a flag for storing the third determination result, and its initial value is 0 (F3=0). In step S36, the abnormality monitoring portion 24 determines whether at least two of the first flag F1, the second flag F2, and the third flag F3 are set at 1. If at least two of the first flag F1, the second flag F2, and the third flag F3 are not set at 1 (step S36: NO), that is, if at least two of the first to third determination results are "normal", the abnormality monitoring portion 24 determines that all the output signals V1, V2, and V3 are normal (step S37). Then, the rotation angle calculation unit 20 proceeds to step S4 in the rotation angle calculation routine shown in FIG. 2.

On the other hand, if it is determined in step S36 that at least two of the first flag F1, the second flag F2, and the third flag F3 are set at 1 (step S36: YES), the abnormality monitoring portion 24 determines whether the flags F1, F2, and F3 are all set at 1 (step S38). If all the flags F1, F2, and F3 are set at 1 (step S38: YES), that is, if the first to third determination results are all "abnormal", the abnormality monitoring portion 24 determines that at least two of the first output signal V1, the second output signal V2, and the third output signal V3 are abnormal (step S39). Then, the rotation angle calculation unit 20 proceeds to step S4 in the rotation angle calculation routine shown in FIG. 2.

In contrast, if two of the first flag F1, the second flag F2, and the third flag F3 are set at 1 while the remaining one is set at 0 (i.e., the initial value) (step S38: NO), the abnormality monitoring portion 24 determines whether the first flag F1 and the second flag F2 are set at 1 (step S40). If the first flag F1 and the second flag F2 are set at 1 (step S40: YES), that is, if the first and second determination results are "abnormal" and the third determination result is "normal", the abnormality monitoring portion 24 determines that the first output signal V1 is abnormal (step S41). Then, the rotation angle calculation unit 20 proceeds to step S4 in the rotation angle calculation routine shown in FIG. 2.

On the other hand, if it is determined in step S40 that one of the first flag F1 and the second flag F2 is not set at 1 (step S40: NO), the abnormality monitoring portion 24 determines whether the first flag F1 and the third flag F3 are set at 1 (step S42). If the first flag F1 and the third flag F3 are set at 1 (step S42: YES), that is, if the first and third determination results are "abnormal" and the second determination result is "normal", the abnormality monitoring portion 24 determines that the second output signal V2 is abnormal (step S43). Then, the rotation angle calculation unit 20 proceeds to step S4 in the rotation angle calculation routine shown in FIG. 2.

On the other hand, if it is determined in step S42 that one of the first flag F1 and the third flag F3 is not set at 1 (step S42: NO), the abnormality monitoring portion 24 determines that the second flag F2 and the third flag F3 are set at 1. That is, at this time, the abnormality monitoring portion 24 determines that the second and third determination results are "abnormal" and the first determination result is "normal". In this case, the abnormality monitoring portion 24 determines that the third output signal V3 is abnormal (step S44). Then, the rotation angle calculation unit 20 proceeds to step S4 in the rotation angle calculation routine shown in FIG. 2.

According to the foregoing example embodiment, it is possible to detect an output signal abnormality based on the fact that one of the first output signal V1, the second output signal V2, and the third output signal V3 is abnormal, and further identify the abnormal output signal among the output signals V1, V2 and V3. Also, it is possible to calculate the rotation angle θ of the rotor 1 based on two normal output signals, among the first output signal V1, the second output signal V2, and the third output signal V3, without using the remaining one that is abnormal. Therefore, even if one of the three magnetic sensors 11, 12, and 13 malfunctions, the rotation angle θ of the rotor 1 is accurately calculated.

The disclosure has been explained in conjunction with the specific exemplary embodiment thereof. However, it is evident that many alternatives, modifications, and variations will be apparent to those skilled in the art. Accordingly, the examples of the disclosure as set forth herein are intended to be illustrative, not limiting. There are changes that may be made without departing from the scope of the claims. For example, the invention may be applied also to a case where the rotation angles of various rotors other than rotors of brushless motors are detected.

What is claimed is:

1. A rotation angle detection device that includes a first sensor, a second sensor, and a third sensor that output, respectively, a first sinusoidal signal, a second sinusoidal signal, and a third sinusoidal signal, which are different in phase from each other, according to rotation of a rotor, and that detects a rotation angle of the rotor based on the first, second, and third sinusoidal signals, comprising:
    a determination unit that determines, based on the first sinusoidal signal, the second sinusoidal signal, and the third sinusoidal signal, whether the first sinusoidal signal, the second sinusoidal signal, and the third sinusoidal signal are each normal or abnormal, the determination unit comprising:
        a first determination unit that determines, based on the first and second sinusoidal signals, whether there is a possibility that at least one of the first and second sinusoidal signals is presently abnormal;
        a second determination unit that determines, based on the first and third sinusoidal signals, whether there is a possibility that at least one of the first and third sinusoidal signals is presently abnormal;
        a third determination unit that determines, based on the second and third sinusoidal signals, whether there is a possibility that at least one of the second and third sinusoidal signals is presently abnormal; and
        a fourth determination unit that determines, based on results of determinations made by the first, second, and third determination units, whether the first sinusoidal signal, the second sinusoidal signal, and the third sinusoidal signal are each normal or abnormal; and
    a rotation angle calculation unit that calculates the rotation angle of the rotor based on at least two sinusoidal signals that are among the first sinusoidal signal, the second sinusoidal signal, and the third sinusoidal signal, and that are determined as being normal by the determination unit.

2. The rotation angle detection device according to claim 1, wherein:
    the first sensor is a sensor that outputs, as the first sinusoidal signal, a first sinusoidal signal V1 corresponding to a rotation angle θ as the rotation angle of the rotor, the first sinusoidal signal V1 being expressed as V1=sin θ;
    the second sensor is a sensor that outputs, as the second sinusoidal signal, a second sinusoidal signal V2 corresponding to the rotation angle θ of the rotor, the second sinusoidal signal V2 being expressed as V2=sin(θ+α) where α represents a phase difference between the first and second sinusoidal signals;
    the third sensor is a sensor that outputs, as the third sinusoidal signal, a third sinusoidal signal V3 corresponding to the rotation angle θ of the rotor, the third sinusoidal signal V3 being expressed as V3=sin(θ+β) where β represents a phase difference between the first and third sinusoidal signals;
    the first determination unit determines whether there is a possibility that at least one of the first and second sinusoidal signals is presently abnormal, based on whether a first condition represented by an expression (i) is satisfied;
    the second determination unit determines whether there is a possibility that at least one of the first and third sinusoidal signals is presently abnormal, based on whether a second condition represented by an expression (ii) is satisfied; and
    the third determination unit determines whether there is a possibility that at least one of the second and third sinusoidal signals is presently abnormal, based on whether a third condition represented by an expression (iii) is satisfied,
    the first expression (i), the second expression (ii), and the third expression (iii) being $$1 - d \leq V1^2 + V_{12}^2 \leq 1 + d \quad \text{(i)}$$
where
$$V_{12} = \frac{V2 - V1 \cdot \cos\alpha}{\sin\alpha}$$

$$1 - d \leq V1^2 + V_{13}^2 \leq 1 + d \quad \text{(ii)}$$
where
$$V_{13} = \frac{V3 - V1 \cdot \cos\beta}{\sin\beta}$$

$$1 - d \leq V2^2 + V_{23}^2 \leq 1 + d \quad \text{(iii)}$$
where
$$V_{23} = \frac{V3 - V2 \cdot \cos(\beta - \alpha)}{\sin(\beta - \alpha)}$$

wherein d is a constant of equal to or larger than 0.

3. The rotation angle detection device according to claim 1, wherein
    the rotation angle calculation unit comprises:
    a first rotation angle calculation unit that calculates a first rotation angle that corresponds to the rotation angle of the rotor, based on the first and second sinusoidal signals;
    a second rotation angle calculation unit that calculates a second rotation angle that corresponds to the rotation angle of the rotor, based on the first and third sinusoidal signals;
    a third rotation angle calculation unit that calculates a third rotation angle that corresponds to the rotation angle of the rotor, based on the second and third sinusoidal signals; and
    a fourth rotation angle calculation unit that calculates a final rotation angle based on the rotation angles that are among the first rotation angle calculated by the first rotation angle calculation unit, the second rotation angle calculated by the second rotation angle calculation unit, and the third rotation angle calculated by the third rotation angle calculation unit, and that are calculated based on a combination of the sinusoidal signals determined as being normal by the determination unit.

4. The rotation angle detection device according to claim 2, wherein the rotation angle calculation unit comprises:

a first rotation angle calculation unit that calculates a first rotation angle that corresponds to the rotation angle of the rotor, based on the first and second sinusoidal signals;

a second rotation angle calculation unit that calculates a second rotation angle that corresponds to the rotation angle of the rotor, based on the first and third sinusoidal signals;

a third rotation angle calculation unit that calculates a third rotation angle that corresponds to the rotation angle of the rotor, based on the second and third sinusoidal signals; and a fourth rotation angle calculation unit that calculates a final rotation angle based on the rotation angles that are among the first rotation angle calculated by the first rotation angle calculation unit, the second rotation angle calculated by the second rotation angle calculation unit, and the third rotation angle calculated by the third rotation angle calculation unit, and that are calculated based on a combination of the sinusoidal signals determined as being normal by the determination unit.

5. The rotation angle detection device according to claim 3, wherein:

the first sensor is a sensor that outputs, as the first sinusoidal signal, a first sinusoidal signal V1 corresponding to a rotation angle θ as the rotation angle of the rotor, the first sinusoidal signal V1 being expressed as V1=sin θ;

the second sensor is a sensor that outputs, as the second sinusoidal signal, a second sinusoidal signal V2 corresponding to the rotation angle θ of the rotor, the second sinusoidal signal V2 being expressed as V2=sin(θ+α) where α represents a phase difference between the first and second sinusoidal signals;

the third sensor is a sensor that outputs, as the third sinusoidal signal, a third sinusoidal signal V3 corresponding to the rotation angle θ of the rotor, the third sinusoidal signal V3 being expressed as V3=sin(θ+β) where β represents a phase difference between the first and third sinusoidal signals;

the first rotation angle calculation unit calculates, as the first rotation angle, a first rotation angle $\theta_1$ according to an expression (iv);

the second rotation angle calculation unit calculates, as the second rotation angle, a second rotation angle $\theta_2$ according to an expression (v); and the third rotation angle calculation unit calculates, as the third rotation angle, a third rotation angle $\theta_3$ according to an expression (vi), the expression (iv), the expression (v), and the expression (vi) being $$\theta_1 = \tan^{-1}\frac{V1}{V_{12}} \quad \text{(iv)}$$

where $$V_{12} = \frac{V2 - V1 \cdot \cos\alpha}{\sin\alpha}$$

-continued $$\theta_2 = \tan^{-1}\frac{V1}{V_{13}} \quad \text{(v)}$$

where $$V_{13} = \frac{V3 - V1 \cdot \cos\beta}{\sin\beta}$$

$$\theta_3 = \theta_3' - \alpha \quad \text{(vi)}$$

where $$\theta_3' = \tan^{-1}\frac{V2}{V_{23}}$$

$$V_{23} = \frac{V3 - V2 \cdot \cos(\beta - \alpha)}{\sin(\beta - \alpha)}.$$

6. The rotation angle detection device according to claim 4, wherein:

the first sensor is a sensor that outputs, as the first sinusoidal signal, a first sinusoidal signal V1 corresponding to a rotation angle θ as the rotation angle of the rotor, the first sinusoidal signal V1 being expressed as V1=sin θ;

the second sensor is a sensor that outputs, as the second sinusoidal signal, a second sinusoidal signal V2 corresponding to the rotation angle θ of the rotor, the second sinusoidal signal V2 being expressed as V2=sin(θ+α) where α represents a phase difference between the first and second sinusoidal signals;

the third sensor is a sensor that outputs, as the third sinusoidal signal, a third sinusoidal signal V3 corresponding to the rotation angle θ of the rotor, the third sinusoidal signal V3 being expressed as V3=sin(θ+β) where β represents a phase difference between the first and third sinusoidal signals;

the first rotation angle calculation unit calculates, as the first rotation angle, a first rotation angle $\theta_1$ according to an expression (iv);

the second rotation angle calculation unit calculates, as the second rotation angle, a second rotation angle $\theta_2$ according to an expression (v); and the third rotation angle calculation unit calculates, as the third rotation angle, a third rotation angle $\theta_3$ according to an expression (vi), the expression (iv), the expression (v), and the expression (vi) being $$\theta_1 = \tan^{-1}\frac{V1}{V_{12}} \quad \text{(iv)}$$

where $$V_{12} = \frac{V2 - V1 \cdot \cos\alpha}{\sin\alpha}$$

$$\theta_2 = \tan^{-1}\frac{V1}{V_{13}} \quad \text{(v)}$$

where $$V_{13} = \frac{V3 - V1 \cdot \cos\beta}{\sin\beta}$$

$$\theta_3 = \theta_3' - \alpha \quad \text{(vi)}$$

where $$\theta_3' = \tan^{-1}\frac{V2}{V_{23}}$$

$$V_{23} = \frac{V3 - V2 \cdot \cos(\beta - \alpha)}{\sin(\beta - \alpha)}.$$

\* \* \* \* \*